F. GERARD.
Wagon-End Gate.
No. 76,744. Patented April 14, 1868.
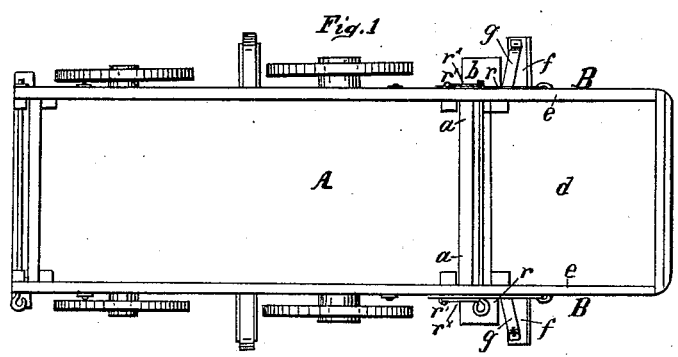
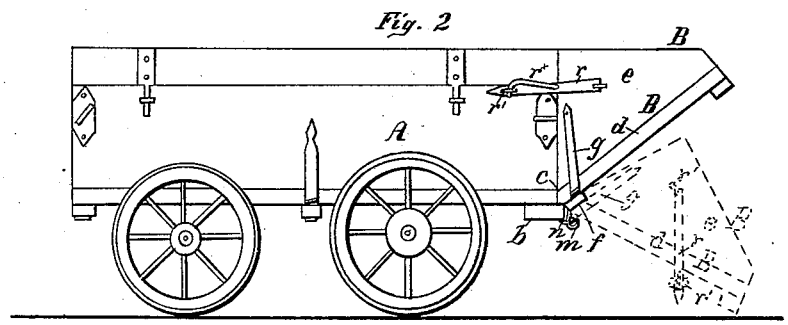

UNITED STATES PATENT OFFICE.

FRANK GERARD, OF LINCOLN, ILLINOIS.

Letters Patent No. 76,744, dated April 14, 1868.

---

IMPROVED HOPPER-ATTACHMENT FOR WAGONS.

---

*The Schedule referred to in these Letters Patent and making part of the same.*

---

TO ALL WHOM IT MAY CONCERN:

Be it known that I, FRANK GERARD, of Lincoln, in the county of Logan, and State of Illinois, have invented a new and improved Hopper-Attachment for Wagons; and I do hereby declare that the following is a full, clear, and exact description of the same, reference being had to the accompanying drawing, making a portion of this specification, in which—

Figure 1 is a plan view, showing a hopper-attachment made according to my invention.
Figure 2 is a side view of the same.
Similar letters of reference indicate corresponding parts in both figures.

This invention consists in the combination of a hopper with the box of a lumber or other wagon, whereby the operation of unloading the wagon, when loaded with apples, potatoes, corn in the ear, or other like articles or freightage, may be greatly facilitated; and whereby, furthermore, by changing the position of the hopper, an inclined plane is provided, which, being formed with side-boards, serving to prevent the lateral movement or discharge of the articles or materials thrown upon such plane, enables the wagon to be unloaded with very great facility.

The invention further consists in certain novel means, whereby the connection or attachment of the hopper to the wagon-box is rendered very secure.

To enable others to understand the nature and construction of my invention, I will proceed to describe it with reference to the drawings.

The wagon-box, which may be of any suitable construction, is shown at A, and should be provided with a removable tail-board, $a$, in the usual or in any appropriate manner. Firmly secured to the under side of the bottom of the box, at the rear end thereof, is a transverse bar or board, $b$, the rear edge of which extends back beyond the adjacent edge of the bottom just mentioned, as shown more plainly in fig. 2, and forms a ledge, upon which rests the forward and lower edge or end, $c$, of the hopper, B. This hopper consists of a bottom, $d$, furnished at each side with a triangular side-piece, $e$. Secured transversely under the inner portion of the bottom, $d$, is a bar, $f$, the ends of which project beyond the sides of the hopper, and from which to such sides extend braces, $g$, which serve to sustain the sides against any outward or lateral strain that may be exerted thereon when the hopper is in use. The bar $f$ is furthermore provided with hooks, $m$, which are hooked into staples, $n$, secured in the bar $b$, so that the hopper is thus, as it were, hinged or pivoted to the bar $b$. Attached to each side of the hopper is a hasp, $r$, which, when the hopper is not in use, fits over a staple, $r'$, provided upon the corresponding side of the box, and is prevented from slipping therefrom by a hook, $r^*$, pivoted to the hasp, and passing through the staple $r'$ outside of the same.

The hopper being secured in the elevated position just hereinbefore described, and the wagon being loaded with apples, corn in the ear, or the like, the tail-board $a$ may be removed, which being done, the inclined bottom of the hopper prevents the loading from falling back out of the wagon, and at the same time permits a shovel to be conveniently inserted to remove the same, thereby dispensing with the necessity, ordinarily incurred, of first removing a small portion of the loading with the fingers, to permit the shovel to be brought properly underneath the loading.

When it is desired to employ the apparatus as an inclined plane, the hasps are removed from the staples $r'$, whereupon the hopper being allowed to fall into the position shown in red outline in fig. 2, the bottom thereof constitutes the inclined plane desired, which serves either as a way over which bulky articles, such as boxes or bales, may be conveyed from the wagon, or, when the loading upon the wagon consists of grain, potatoes, or the like, as a chute upon which such loading may be shovelled, and which, being formed with the side-pieces $e$, serves to guide or convey the loading to the receptacle designed therefor.

It will be borne in mind that, while the hooks $m$ and staples $n$ constitute the hinged connection of the hopper with the bar $b$, or, in other words, with the box, the rear edge or portion of the bar $b$ forms a bearing upon which rests the edge or end, $c$, of the hopper, which is thus sustained thereby, whether in a raised or lowered position.

When the hopper is not in use, as hereinbefore fully set forth, it may be wholly detached from the wagon.

What I claim as my invention, and desire to secure by Letters Patent, is—

1. The combination of the hopper B, formed with side-boards $e$, with the wagon-box A, substantially as and for the purpose specified.

2. The arrangement of the transverse bar $b$, with reference to the rear end of the box A and the edge or end, $c$, of the hopper, substantially as and for the purpose specified.

3. The arrangement of the hasps $r$, staples $r'$, and hooks $r^*$, with reference to each other, and with the triangular side-pieces $e$ of the hopper B and the box A, substantially as and for the purpose specified.

FRANK GERARD.

Witnesses:
    L. H. CRAWFORD,
    B. H. BRAINERD.